R. MORGAN
Nov. 22, 1932. GOLF CLUB SHAFT Re. 18,666
Original Filed June 11, 1930
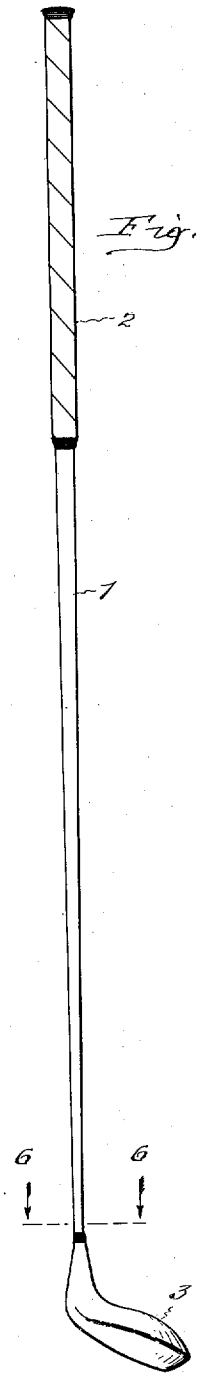
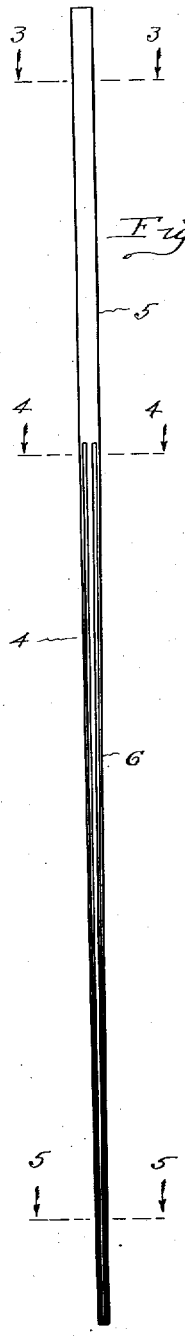
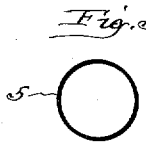
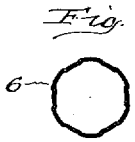
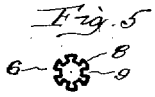
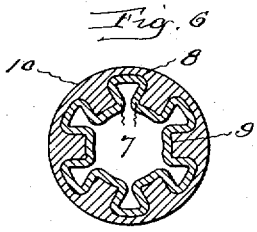
INVENTOR
Robert Morgan by
Harry R. Williams
atty.

Reissued Nov. 22, 1932

Re. 18,666

UNITED STATES PATENT OFFICE

ROBERT MORGAN, OF WEST HARTFORD, CONNECTICUT, ASSIGNOR TO THE AMERICAN FORK & HOE COMPANY, OF CLEVELAND, OHIO, A CORPORATION OF OHIO

GOLF CLUB SHAFT

Original No. 1,848,374, dated March 8, 1932, Serial No. 460,341, filed June 11, 1930. Application for reissue filed September 30, 1932. Serial No. 635,699.

This invention relates to the construction of built up golf club shafts.

The object of the invention is to provide a golf club shaft which is light, strong and durable and which will have the required amount of whip and torsional elasticity.

This object is attained in the embodiment of the invention illustrated by forming a tubular core of thin spring metal that is longitudinally corrugated from handle to head and filling the dedendum spaces and covering the addendum sections of the corrugated part of the core with a composition or compound which is hard and somewhat elastic and that will be retained in place by the core and at the same time will strengthen the core and provide a smooth exterior casing therefor.

In the accompanying drawing Fig. 1 shows a side elevation of a club with a shaft made according to this invention. Fig. 2 is a side view of the core of the shaft. Fig. 3 on larger scale shows a section of the core on the plane indicated by the dotted line 3—3 on Fig. 2. Fig. 4 is an enlarged section of the core on the plane indicated by the dotted line 4—4 on Fig. 2. Fig. 5 is an enlarged section of the core on the plane indicated by the dotted line 5—5 on Fig. 2. Fig. 6 shows on still larger scale a section of the core and casing on the plane indicated by the dotted line 6—6 on Fig. 1.

In the views 1 indicates the shaft, 2 the handle which may be any approved type, and 3 the head of desired shape and weight, a wooden head being shown although the invention is equally applicable to a club having a metal head. The tubular corrugated core 4 is formed of thin sheet metal, preferably carbon steel. This core may have the handle section 5 straight and the remaining section 6 tapered from full size at the end of the handle section to the end that is inserted in the club head.

In manufacturing this core rectangular corrugations of gradually increasing depth and gradually increasing width are made in the portion of a flat piece of sheet metal which is to be between the handle and head of the finished club. This piece is then curved into tubular form and its edges brazed. When this corrugated piece is thus curved the inner edges 7 of the addendum sections are brought together so that the addendum sections become dovetails 8 which will hold the composition in the channels 9 between them.

When the core has been completed the dendendum spaces are filled in and the addendum sections are covered with a compound or composition 10 such as fibroid or bakelite, which when set is hard and durable, but has some elasticity. A core formed in this manner while stiff is capable of some torsional yield and as a result of the dovetail formation of the addendum sections of the core the encasing composition is firmly held in place.

The invention claimed is:

1. A golf club shaft comprising a substantially cylindrical tubular metallic handle portion and a shaft portion integral therewith including a tubular core having its external diameter decreasing from the handle portion toward the head end and having corrugations therein providing external ribs which decrease in width and increase in depth from said handle portion to said head, and an enclosing and stiffening case of composition covering said core and extending from said handle portion to the head and having inwardly directed ribs filling the external grooves of said corrugations between the ribs of said core.

2. A golf club shaft comprising a substantially cylindrical tubular metallic handle portion and a shaft portion integral therewith having its external diameter decreasing from the handle portion toward the head end and having corrugations therein providing external grooves which gradually increase in depth from the cylindrical handle portion to said head end so that the torsional yield of the shaft portion increases from the handle portion to the head end.

3. A golf club shaft comprising a substantially cylindrical tubular metallic handle portion and a shaft portion integral therewith having its external diameter decreasing from the handle portion toward the head end and having corrugations therein providing external ribs which decrease in width and external grooves which increase in depth from said handle portion to said head end.

4. A golf club shaft comprising a substantially tubular metallic handle portion, and a shaft portion including a tubular core having its external diameter decreasing from the handle portion toward the head end and having longitudinally extending corrugations therein providing external ribs which decrease in width and increase in depth from said handle portion to said head, and an enclosing and stiffening, case of composition covering said core and extending from said handle portion to the head and having inwardly directed ribs filling the external grooves of said corrugations between the ribs of said core.

5. A golf club shaft comprising a substantially tubular metallic handle portion, and a shaft portion having its external diameter decreasing from the handle portion toward the head end and having longitudinally extending corrugations therein providing external grooves which gradually increase in depth as the head end is approached so that the torsional yield of the shaft portion increases proceeding in the direction from the handle portion towards the head end.

6. A golf club shaft comprising a substantially tubular metallic handle portion, and a shaft portion having its external diameter decreasing from the handle portion toward the head end and having longitudinally extending corrugations therein providing external ribs which decrease in width and external grooves which increase in depth proceeding in the direction from said handle portion towards said head end.

7. A golf club shaft in the form of a metal tube comprising a handle portion, and a shaft portion including a tubular core having its external diameter decreasing from the handle portion toward the head end and having longitudinally extending corrugations therein providing external ribs which decrease in width and increase in depth from said handle portion to said head, and an enclosing and stiffening case of composition covering said core and extending from said handle portion to the head and having inwardly directed ribs filling the external grooves of said corrugation between the ribs of said core.

8. A golf club shaft in the form of a metal tube comprising a handle portion, and a shaft portion having its external diameter decreasing from the handle portion toward the head end and having longitudinally extending corrugations therein providing external grooves which gradually increase in depth as the head end is approached so that the torsional yield of the shaft portion increases proceeding in the direction from the handle portion towards the head end.

9. A golf club shaft in the form of a metal tube comprising a handle portion, and a shaft portion having its external diameter decreasing from the handle portion toward the head end and having longitudinally extending corrugations therein providing external ribs which decrease in width and external grooves which increase in depth proceeding in the direction from said handle portion towards said head end.

In witness whereof, I hereunto affix my signature, this 23rd day of September, 1932.

ROBERT MORGAN.